United States Patent [19]
Hinman et al.

[11] Patent Number: 5,568,279
[45] Date of Patent: Oct. 22, 1996

[54] REMOTE INTERACTIVE PROJECTOR

[75] Inventors: Brian L. Hinman, Los Gatos; Jeffrey C. Rodman, San Francisco, both of Calif.

[73] Assignee: Polycom, Inc., San Jose, Calif.

[21] Appl. No.: 461,175

[22] Filed: Jun. 5, 1995

Related U.S. Application Data

[63] Continuation of Ser. No. 16,431, Feb. 11, 1993, abandoned.

[51] Int. Cl.⁶ .............................. H04N 1/00; H04N 1/387
[52] U.S. Cl. .......................... 358/452; 358/479; 348/18; 345/2
[58] Field of Search .................................. 358/434, 435, 358/436, 438, 439, 452, 407, 479; 379/96, 100; 348/13, 14, 15, 18; 345/2, 104, 173; 178/18

[56] References Cited

U.S. PATENT DOCUMENTS

| | | |
|---|---|---|
| 4,415,981 | 11/1983 | Cutter et al. . |
| 4,727,431 | 2/1988 | Nakamura et al. . |
| 4,794,634 | 12/1988 | Torihata et al. ........................... 379/96 |
| 4,827,085 | 5/1989 | Yaniv et al. ............................... 379/96 |
| 4,846,694 | 7/1989 | Erhardt .................................... 345/104 |
| 4,911,536 | 3/1990 | Ditzik ...................................... 345/173 |
| 5,038,224 | 8/1991 | Martulli et al. . |
| 5,097,350 | 3/1992 | Baran . |
| 5,115,308 | 5/1992 | Onuki . |
| 5,126,855 | 6/1992 | Saito . |
| 5,374,952 | 12/1994 | Flohr ....................................... 348/15 |
| 5,396,269 | 3/1995 | Gotoh et al. ............................. 348/14 |
| 5,418,560 | 5/1995 | Yasuda .................................... 348/14 |
| 5,432,525 | 7/1995 | Maruo et al. ............................ 345/2 |

*Primary Examiner*—Scott A. Rogers
*Attorney, Agent, or Firm*—Carr, DeFilippo & Ferrell

[57] ABSTRACT

The projector of the present invention provides a means for interactively displaying and annotating a document image at two separate locations. The projector consists of an image plate having an array of picture elements for displaying the image; a projection mechanism for projecting the image displayed by the image plate onto a projection screen; and a digitizer having a coordinate input array which corresponds to the array of picture elements of the image plate, wherein the image displayed by the image plate changes in response to coordinate inputs to the digitizer. A method for interactively annotating an image communicated between a remote and local image includes the procedure of simultaneously transmitting to the remote projector, annotations made to an image in the local projector.

20 Claims, 4 Drawing Sheets

REMOTE INTERACTIVE PROJECTOR

RELATED APPLICATIONS

This is a continuation of application Ser. No. 08/016,431, filed on Fib. 11, 1993, now abandoned.

BACKGROUND OF THE INVENTION

1. Field of the Invention

This invention relates to a projection machine, and more specifically to a projector for generating, annotating, and storing documents, and for interactively communicating the documents and annotations with a remote projector or other electronic device, 2. Description of the Background Art Document projection devices are well known. The traditional device is a transparency machine consisting of a light box and a beam projection apparatus. The light box contains a projection lamp and a top surface of glass. The transparency is placed upon the glass surface and the lamp shines up through the transparency forming an image beam which is collected, focused, and projected by the beam projection apparatus. The beam projection apparatus generally consists of a mirror diagonally positioned between a pair of lenses. These devices are simple in construction, but offer little flexibility for storing or manipulating the images. Further, no capability exists for communicating these images simultaneously to a remote user, or for a remote user to interactively make changes to the projected image. What is needed is an apparatus for projecting a document, which allows the document to be easily annotated and stored, and which can-be simultaneously projected and annotated using a second projector at a remote location.

SUMMARY OF THE INVENTION

An interactive projector photographs and stores the image of a document using a conventional CCD camera. The digital image is stored by a processor-based motherboard to an array of image memory. The contents of the memory are displayed on a transparent Liquid Crystal Display (LCD) image plate. Using a projection lamp to provide rear lighting to the image plate, the image displayed on the image plate is projected onto a screen for viewing. A transparent pressure-sensitive digitizer is affixed to the image plate and permits a user, with the aid of a stylus, to point to coordinates on the digitizer and to change the transparency of corresponding picture elements on the image plate. The "local" projector may be connected to a "remote" projector or communication device using a modem. When the projector is connected to a remote projector, annotations made to the image plate of the local projector are simultaneously transmitted to the remote projector. Also during interactive use, changes made to the image plate of the remote projector are received and used to update the image plate of the local projector.

DESCRIPTION OF THE PREFERRED EMBODIMENT

Figure 1:
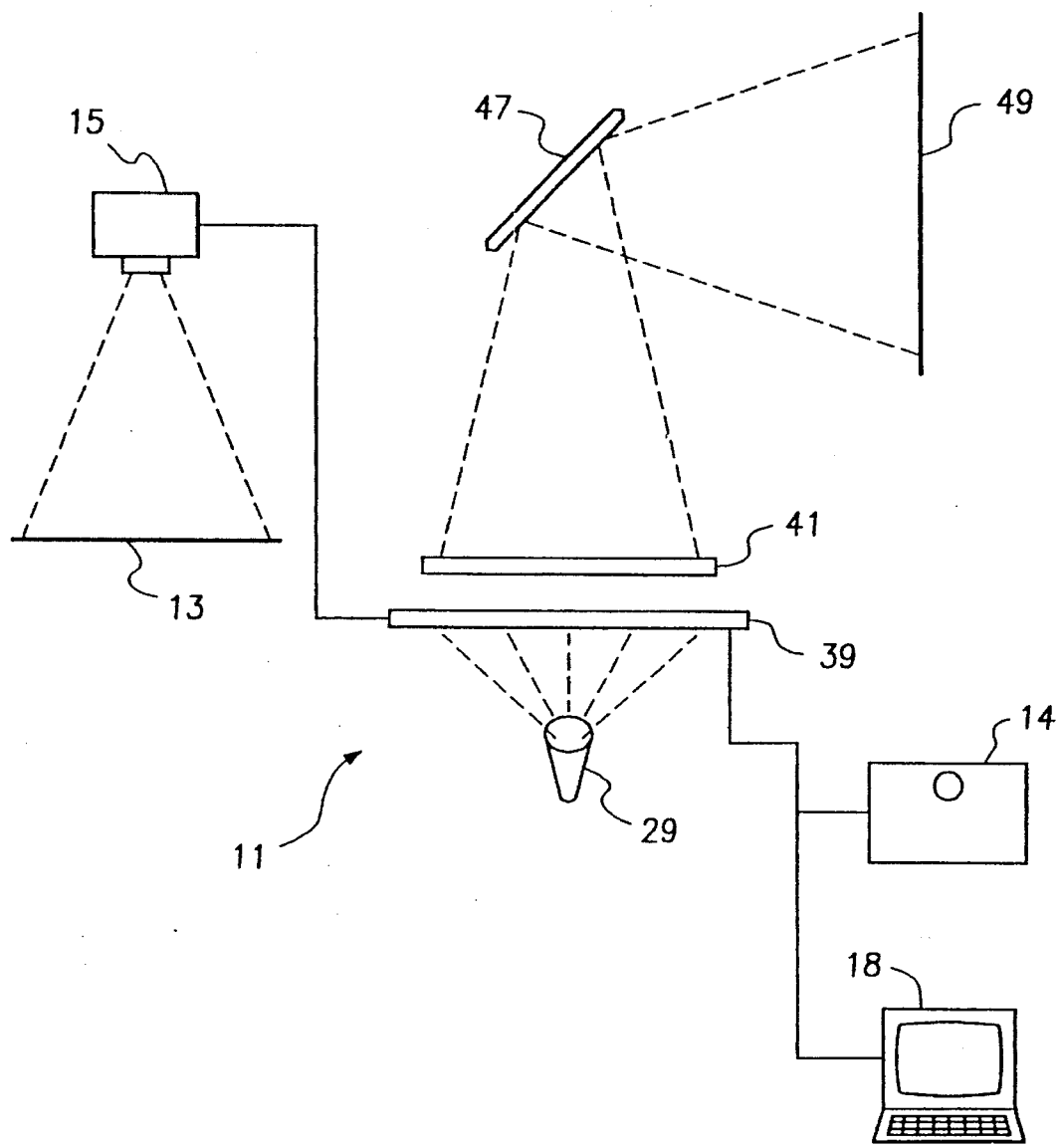
FIG. 1 is a schematic diagram showing a preferred embodiment of the projector of the present invention.

Referring now to FIG. 1, an overview of the preferred embodiment of a remote interactive projector 11 is shown. Document 13 is photographed using camera 15 and transmitted to image plate 39. A user is subsequently able to annotate, or otherwise modify image plate 39 using digitizer 41. The image appearing on image plate 39 is then projected to screen 49 using rear projection lamp 29. Mirror 47 is used to position the projection of the image on screen 49. The annotated image appearing on image plate 39 can simultaneously be printed on printer 14, transmitted to a remote projector (not shown) via modem 16 (FIG. 2), or manipulated by a general purpose computer 18. Projector 11 is also capable of receiving images for display on image plate 39 via modem 16 and computer 18.

Figure 2:
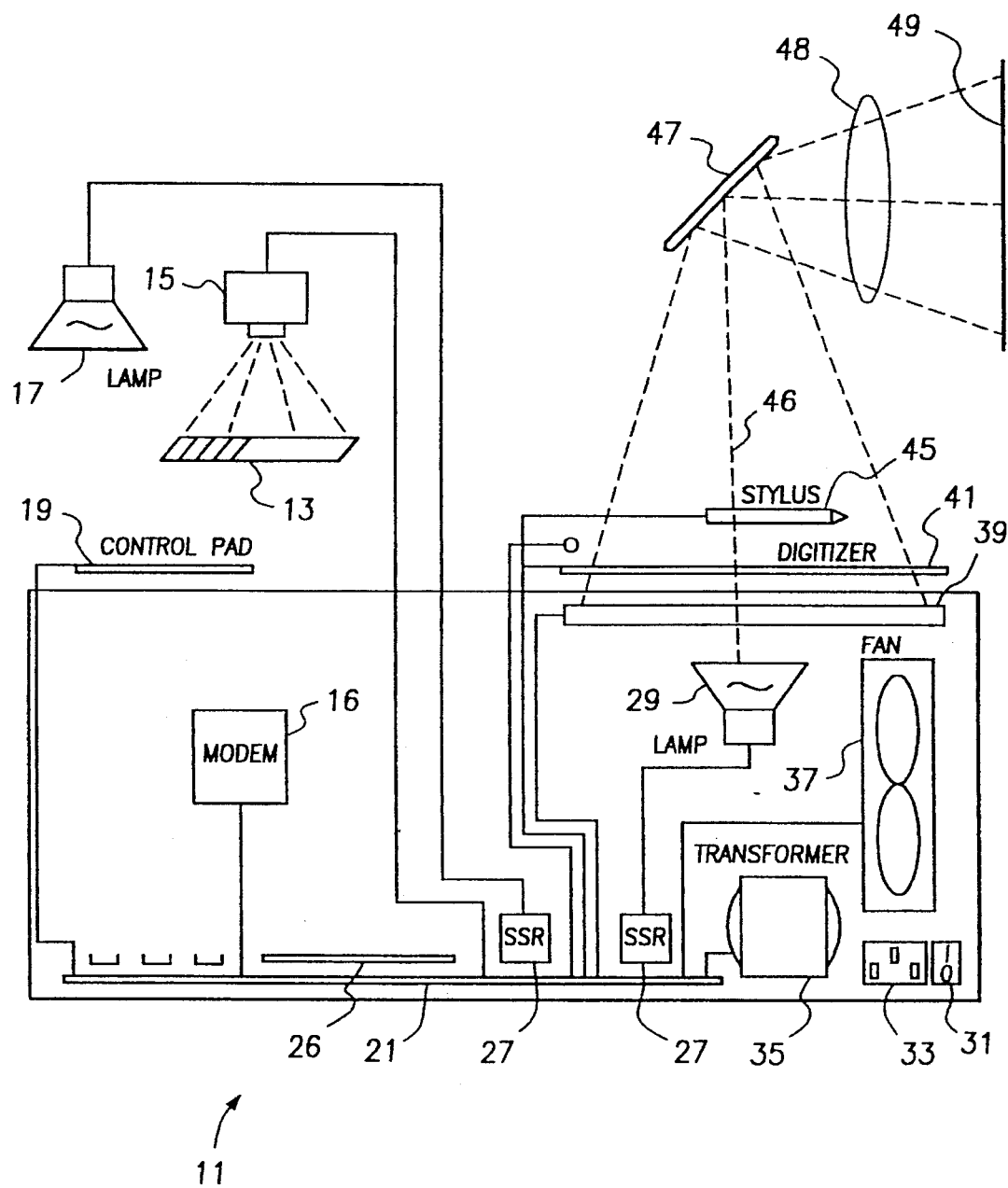
FIG. 2 is a schematic diagram showing details of the projector of FIG. 1.

Referring now to FIG. 2, a more detailed illustration is provided of projector 11 shown in FIG. 1. Document 13 is a sheet of text or drawing that the user wishes to display, annotate and 18 transmit to a remote user. The document can be a single sheet, a page from an open book, or a transparency. Lamp 17 provides lighting for the text, either from the top side of document 13, in the case of an opaque document, or from the backside of document 13 where the document is a transparency. A digital image is then collected using a conventional CCD camera 15. The digital image collected by CCD camera 15 is then transmitted and stored in memory 26 which resides on motherboard 21. Motherboard 21 is a microprocessor-based electronic controller for operating and effecting the various functions of projector 11. Once collected, the stored image is transferred and displayed by image plate 39. In the preferred embodiment, image plate 39 is a conventional liquid crystal display (LCD) panel having an array of picture elements which individually convert from transparent to opaque in response to applied digital signals. Rear projection lamp 29 shines through image plate 39 and projects the image displayed by the opaque picture elements of the image plate.

Digitizer 41, in the preferred embodiment, is a transparent, pressure sensitive plastic sheet which rests atop image plate 39. Digitizer 41 contains an array of coordinates which coincide or map to the array of picture elements of image plate 39. Using digitizer 41 in conjunction with stylus 45, the user is able to make alterations to the image projected through image plate 39. For each "mark" made by pressing stylus 45 on digitizer 41, an identical digital representation of the mark is stored in memory 26 and displayed by image plate 39. "Marking" on the digitizer 41 with stylus 45 does not physically alter the surface of digitizer 41, but 18 rather each successive digitizer 41 coordinate pointed to by stylus 45 results in the image plate 39 picture element which coincides with that pointed digitizer 41 coordinate changing from transparent to opaque. Various alternative embodiments of digitizer 41 will be readily apparent. Rather than rest atop image plate 39, digitizer 41 could be embodied as a conventional digitizing pad which is positioned adjacent to image plate 39, and the position of stylus 45 would appear as a cursor notation on image plate 39.

Mirror 47 lies in the projection path produced by the rear illumination of image plate 39 by lamp 29, and is used to reflect the projected image of the rear-illuminated image plate 39 onto a wall-mounted or free-standing vertical projection screen 49. Projection lens 48 is also positioned in projection path 46, adjacent to mirror 47, for the purpose of focusing and magnifying the projected image.

Conventional power components are used to supply projector 11. Plug 33 supplies 120 VAC power to transformer 35. Connection to the mains is controlled via ON/OFF switch 31. Transformer 35 steps the mains power to a voltage level suitable for supplying the digital components on motherboard 21. High voltage components such as illumination lamp 17 and projection lamp 29 are controlled from motherboard 21 using solid state relays 27. Cooling is provided to the projector electronics and lamps using fan 37. Functionality and control over motherboard 21 is generally provided through control pad 19, which is more completely discussed in FIG. 3.

Figure 3:
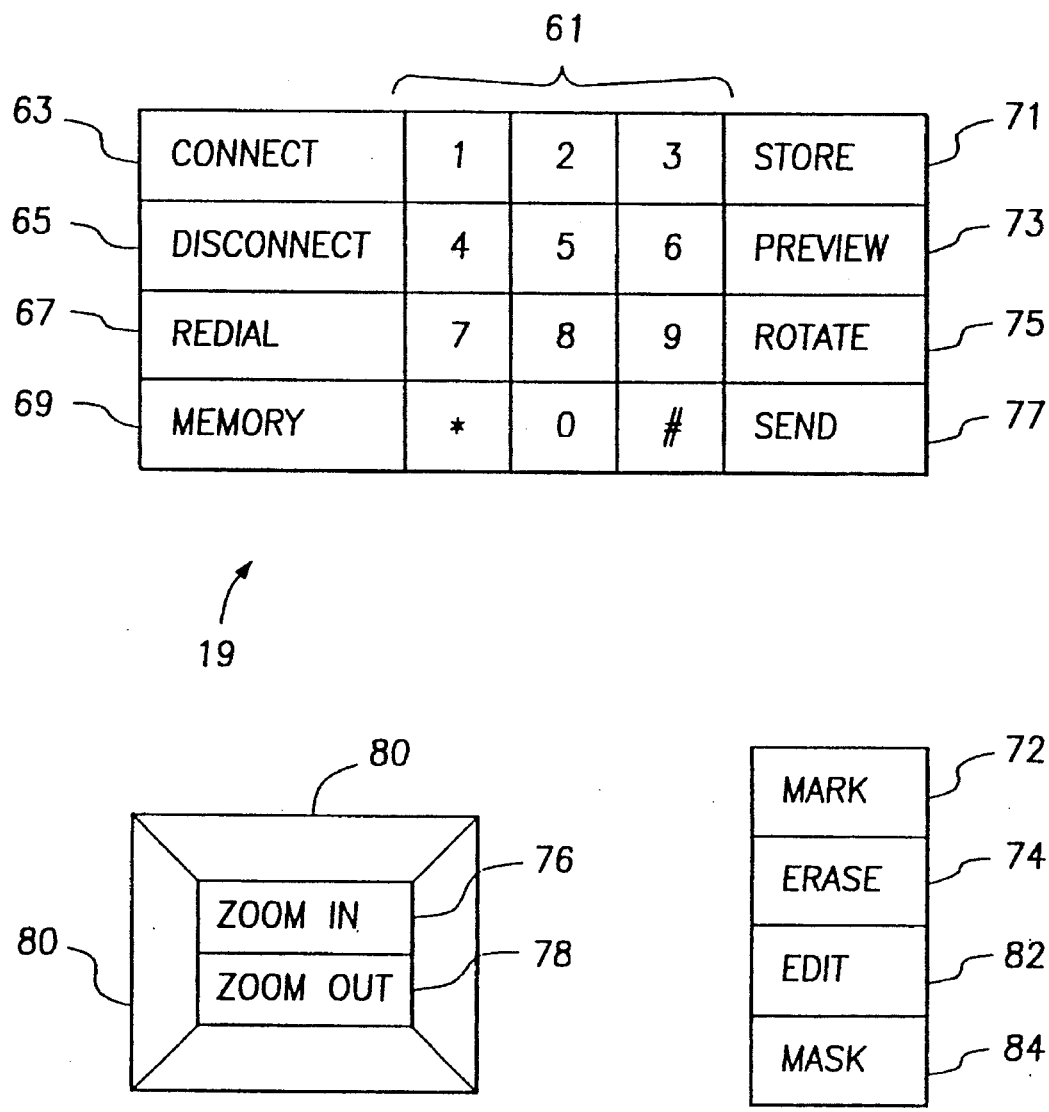
FIG. 3 is a diagram showing the control pad of the projector of FIG. 1.

Referring now to FIG. 3, a detailed diagram is shown of the preferred embodiment of control pad 19. Dial pad 61 is used to dial a remote projector unit connected via modem 16 (shown in FIG. 2). Dial pad 61 contains the traditional telephone numbers "1"–"9", "*" and "#". Pads 63–69 to the left of dial pad 61 are used to control communications between projector 11 and a remote projector unit (not shown). Connect pad 63 is used to gain access to the telephone line via modem 16, prior to dialing the telephone number of the remote projector. Disconnect pad 65 is used to discontinue communication with the remote projector, and is the equivalent of "hanging up" following the completion of the communication activities. Redial pad 67 allows redialing of the last dialed phone number. Memory pad 69 is used in conjunction with the numeric dial pad 61 to store telephone numbers of frequently dialed remote projectors or other remote communication devices such as facsimile machines and computers.

Pads 72–84 are used to control image manipulation within projector 11. Store pad 71 operates to store an image of document 13 using camera 15. Pressing store pad 71 effectively erases the contents of memory 26 and stores the new image of the photographed document. Depressing preview pad 73 enables previewing the document image recorded by camera 15 on image plate 39, prior to storing or sending the image to a remote communication device. Rotate pad 75 is used to rotate the document 75 in memory. This rotation process is the electronic equivalent of physically rotating document 13 as it appears with respect to camera 15. Send pad 77 is used to transmit the digital information recorded by camera 15 to a remote projector or communication device.

Mark pad 72 is used to control the annotation operation of stylus 45. Following the pressing of mark pad 72, whenever stylus 45 is pressed against digitizer 41, the picture elements of image plate 39 are transformed from transparent to opaque. Erase pad 74 performs the inverse function to mark pad 72. Stylus marks made with this function engaged, cause opaque picture elements on image plate 39 to change to transparent. Erase pad 74 allows the user to erase portions of the image displayed on image plate 39, using stylus 45. Zoom In pad 76 causes a telephoto lens on camera 15 to zoom in and thereby causes specific sections of the document to be enlarged. Zoom Out pad 78 reverses the magnification of the lens in camera 15, thereby allowing more of the document 13 page to be displayed. In an alternative embodiment, the zoom feature operates on the image stored in memory 26 rather than operating on camera 15. Depressing Zoom In pad 76 causes image data stored in memory 26 to be algorithmically expanded to allow the user to fill image plate 39 with only a subset of the image data stored in memory 26. In much the same way as the user zoomed in and out on document 13 in the preferred embodiment by adjusting the magnification of the telephoto lens, the user in this alternative embodiment is able to zoom in on data stored in memory 26. Directional arrows 80 permit the user to select portions of the document image stored in memory 26 to be displayed on image plate 39. Using the appropriate direction arrows 80, the user can pan up, down, to the left and to the right on document 13.

Edit pad 82 enables the user to cut material displayed on image plate 39. By pressing and holding edit pad 82, the user draws a box using stylus 45 on digitizer 41 around undesired material displayed on image plate 39. By releasing the edit pad 82, the image data stored in memory 26 relating to the encircled image, displayed on image plate 39 is suppressed from being displayed on image plate 39. In a similar manner, mask pad 84 is used to suppress the display of material contained outside of the inscribed area. By depressing mask pad 84 and inscribing image material displayed on image plate 39, the image material outside the area will be masked and not displayed.

Figure 4:
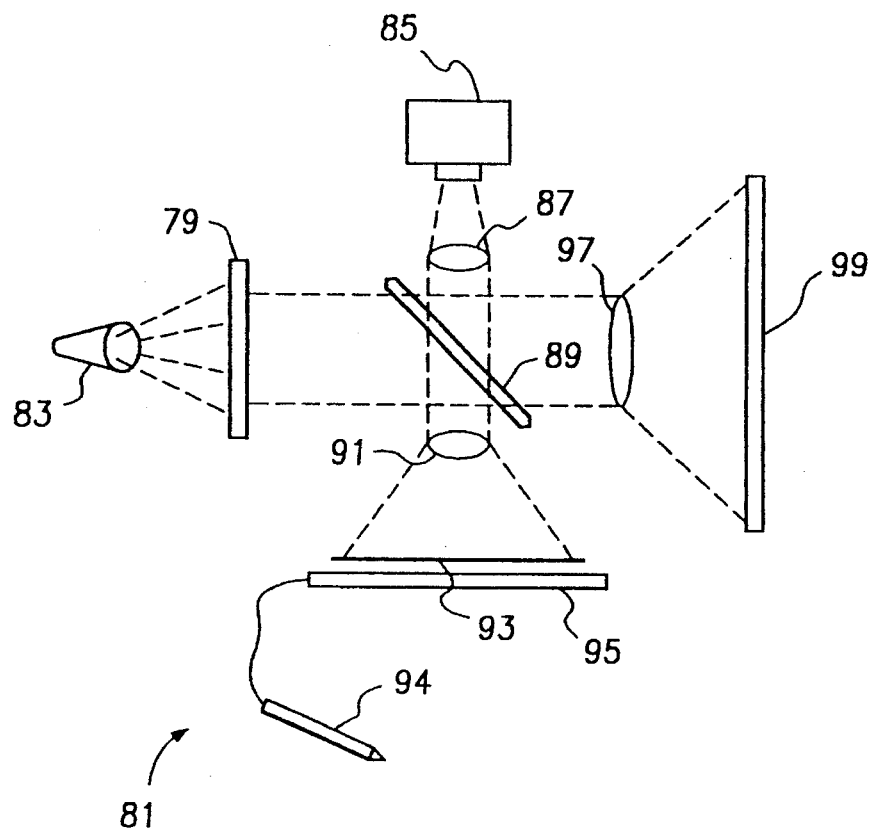
FIG. 4 is a schematic diagram showing an alternative embodiment of the projector of the present invention.

Referring now to FIG. 4, an alternative embodiment, projector 81, of the present invention is shown. In this alternative embodiment, document 93 is placed on top of digitizer 95 and photographed using camera 85. Document 93 is then removed from digitizer 95 and the camera then sends the image to image plate 79. Document 93 and camera 85 could also be arranged adjacent to digitizer 95; however, the configuration shown provides a convenient alignment surface for document 93.

Projection lamp 83 projects through image plate 79 to beam splitter 89. Part of the projected image from image plate 79 passes through beam splitter 89 to projection lens 97 where the image is magnified and displayed on screen 99. The remainder of the projected image from image plate 79 is reflected by the beam splitter 89 onto digitizer 95, where stylus 94 can be used to annotate the image as discussed in the preferred embodiment above. Digitizer 95 preferably has a reflective surface to allow easy viewing of the reflected image from beam splitter 89. The annotations are transmitted back to image plate 79 where they are combined with the original document image to produce an annotated document image which then forms a composite projected image on screen 99.

Figure 5:
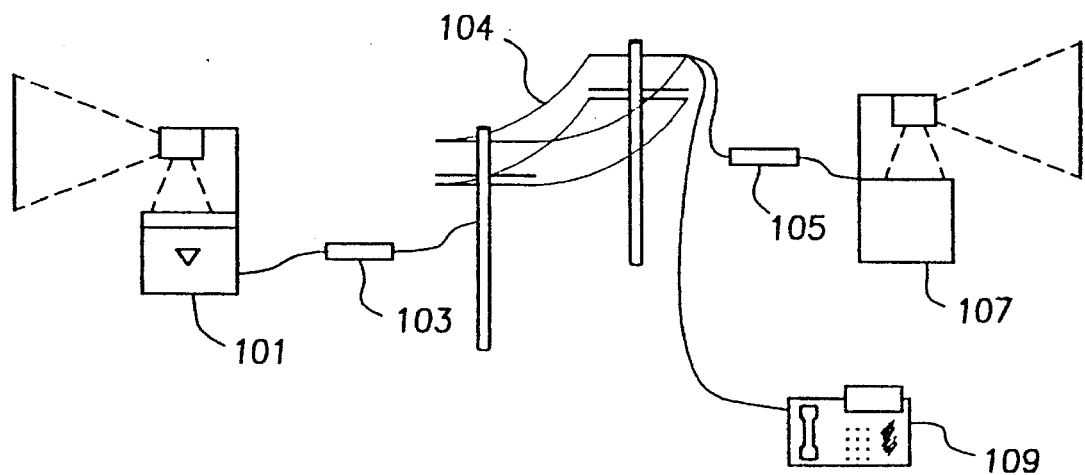
FIG. 5 is a schematic diagram showing a pair of projectors 101 and 107 connected for interactive operation.

Referring now to FIG. 5, a schematic diagram shows a pair of projectors 101,107 connected through modems 103, 105 and telephone lines 104. FIG. 5 is presented for the purpose of discussing the method for using two projectors to interactively transmit images and image annotations. For the purpose of this methodology discussion, projector 101 will be referred to as the "local" projector and projector 107 will be referred to as the "remote" projector. In order to more clearly specify features of the projectors 101,107 when discussing the interactive operation, the single set of feature numbers referenced in FIG. 2 will be used; however, projectors 101 and 107 are separate units and each has its own complement of the components shown in FIG. 2. Modems 103 and 105 are shown to be separate from the their respective projectors 101,107; however, it should be noted that these modems are of conventional technology and are housed within each of the projectors 101,107 and electrically connected to motherboard 21 (FIG. 2).

The user operates projector 101 by first aligning camera 15 with document 13. Illumination of document 13 by lamp 17 may be required to obtain a sufficiently bright image of document 13. Preview pad 73 (FIG. 3) is used to adjust document 13 so that its image is properly centered on image plate 39. The document image is then stored using store pad 71. Communication is established with the remote projector 107 by dialing the telephone number of remote projector 107 using dial pad 61 on local projector 101 and by subsequently pressing connect pad 63. Remote project 107 will answer the telephone call placed by local projector 101 and will automatically initiate communication with projector 101 when the call is identified as coming from another projector.

Once a connection between projectors 101 and 107 is made, local projector 101 transmits its image stored in memory 26 to remote projector 107 in response to activation of send pad 77 of projector 101 by the user. Remote projector 107 receives the image from local projector 101 and stores the received image in its memory 26. The image stored by remote projector 107 is subsequently operated on as though the stored image were collected and stored by camera 15 of remote projector 107. The images contained in memories 26 of both projectors 101,107 are now identical. Once the transmitted image is stored by remote projector 107, users operating the two projectors 101,107 can begin interactively annotating the common stored image. The process for annotating the image is described with respect to FIG. 2 above. The user operating local projector 101, for instance, "marks" on the image by pressing and dragging stylus 45 along the coordinate surface of digitizer 41. Picture elements on image plate 39 of local projector 101 which coincide with the various marked coordinates of digitizer 41 are converted from transparent to opaque (or opaque to transparent of erase pad 74 is engaged). When local projector 101 is connected to remote projector 107, the marks which are generated on image plate 39 of local projector 101, are simultaneously transmitted to and appear on image plate 39 of remote projector 107.

The updating of remote projector 107 occurs in a manner analogous to the updating of image plate 39 of local projector 101. Annotations which are generated by marking local projector 101 digitizer 41 with stylus 45 are decoded as coordinates by the processor resident on motherboard 21 of local projector 101. Each coordinate pointed to by stylus 45 on digitizer 41 is decoded and used to update memory 26. Since image plate 39 displays the contents of memory 26, changing the contents of memory 26 also has the effect of changing the image displayed on image plate 39. When local projector 101 is connected to a remote projector 107, the coordinate decoded by local projector 101 is simultaneously transmitted to the processor on motherboard 21 of remote projector 107 via the path created by modem 103, telephone line 104 and modem 105. This transmitted coordinate is received by remote projector 107 and used to update its memory 26 and consequently the image plate 39 of remote projector 107.

Correspondingly, changes made to memory 26 of remote projector 107 are transmitted to and received by local projector 101, resulting in a change to memory 26 and the image displayed on image plate 39 of local projector 101. It should be noted that following the initial transmission of the document 13 image, only changes to memory locations are transmitted to and from the two projectors 101 and 107. When communication between projectors 101,107 is completed, disconnect pad 65 is pressed to release the telephone line and break the communication link.

Although the above discussion with reference to FIG. 5 describes communication between two projectors, multiple projectors may be similarly linked using a distributed communication network or conference call telephone connection, and thereby operate interactively.

In summary, interactive projector 11 photographs and stores the image of a document 13 using a conventional CCD camera 15. The digital image is stored by a processor-based motherboard 21 to an array of image memory 26. The contents of memory 26 are displayed on a transparent LCD image plate 39. Using a projection lamp 29 to rear-light image plate 39, the image displayed on image plate 39 is projected onto a screen 49. A transparent plastic pressure-sensitive digitizer 41 is affixed to image plate 39 and permits a user, with the aid of a stylus 45, to point to coordinates on digitizer 41 and to change the transparency of corresponding picture elements on image plate 39. The projector 11 may be connected to a remote projector or communication device using modem 16. When projector 11 is connected to a remote projector, annotations made to image plate 39 are simultaneously transmitted to the remote projector. Also during interactive use, changes made to the image plate of the remote projector are received and used to update image plate 39 of projector 11.

What is claimed is:

1. A remote interactive projector comprising:
   a CCD camera adapted for recording an image of a document;
   illumination means for illumination of said document to obtain a sufficiently bright image recorded by the camera;
   a motherboard having a memory, said motherboard being connected to the CCD camera for receiving the recorded image and storing the image in the memory;
   an image plate connected to the camera motherboard for receiving the recorded image from the memory and displaying the recorded image;
   a digitizer coupled to the image plate enabling annotation of the recorded image; and
   projection means coupled to the image plate for projecting the recorded image onto a projection screen.

2. The projector in accordance with claim 1, further comprising a modem for transmitting the annotated image to a remotely located modem.

3. The projector in accordance with claim 1, wherein the digitizer is transparent.

4. The projector in accordance with claim 1, wherein the projector means further comprises a projection path originating from the image plate and terminating at the projection screen for containing the projected image.

5. The projector in accordance with claim 4, wherein the digitizer is located within the projection path.

6. The projector in accordance with claim 4 further comprising beam splitting means located within the projection path for diverting part of the projected image away from the projection path and onto a secondary path.

7. The projector in accordance with claim 6, wherein the digitizer located within the secondary path.

8. The projector means in accordance with claim 7, wherein the digitizer comprises a reflective surface enabling the image carried along the secondary path to be viewed from the surface of the digitizer.

9. The projector in accordance with claim 4, wherein the projection means further comprises a projection lens collinearly disposed along the projection path for aligning and focussing the projected image on the screen.

10. The projector in accordance with claim 1, wherein the digitizer comprises a flat transparent digitizer having a top surface across which the coordinate input array is disposed.

11. The projector in accordance with claim 10, wherein the digitizing means is sensitive to the position of a pointing means.

12. The projector in accordance with claim 1, wherein the projector further comprises a processor for receiving, manipulating and transmitting digital image data between the image means and the digitizing means.

13. The projector in accordance with claim 1, further comprising communication means connected to the image means and the digitizing means for communicating image data to and from remote communication devices.

14. A method for interactively displaying and annotating a stored digital image of a document between a local projector and a remote projector, said digital image being stored in the memory of a motherboard in the local projector wherein the method comprises the steps of:

establishing a communication link between the remote and local projectors;

transmitting the stored digital image from the local projector to the remote projector;

receiving and storing the digital image by the remote projector which was transmitted by the local projector;

annotating the stored digital image by the remote projector;

displaying the annotated image by the remote projector while simultaneously transmitting the annotations back to the local projector for annotation of the stored digital image in the local projector; and displaying the annotated stored digital image in the local projector.

15. The method according to claim 14 for interactively displaying and annotating a stored digital image of a document, further comprising;

a first step of illuminating the document to obtain a sufficiently bright image; and a second step of digitally photographing the document by a CCD camera connected to the motherboard in the local projector to produce a stored digital image in the memory.

16. The method according to claim 14 further comprising additional communication devices linked to the local and remote projectors for interactively communicating with the local and remote projectors.

17. The method according to claim 14 wherein the local and remote projectors each comprise a digitizer, wherein the steps of annotating the stored digital image are performed by entering data using the digitizer.

18. The method according to claim 14 wherein the local and remote projectors each comprise an image plate consisting of an array of picture elements, wherein the steps of displaying the stored digital images are performed by activating image plate picture elements corresponding to the stored digital image.

19. The method of claim 14 wherein either of the local and remote projectors is replaced by a general purpose computer.

20. A method for interactively displaying and annotating a stored digital image of a document between a local projector and a remote projector, said digital image being stored in the memory of a motherboard in the local projector, wherein the method comprises the steps:

establishing a communication link between the remote and local projectors;

transmitting the stored digital image from the local projector to the remote projector;

receiving and storing the digital image by the remote projector which was transmitted by the local projector;

annotating the stored digital image by the local projector;

displaying the annotated image by the local projector while simultaneously transmitting the annotations back to the remote projector for annotation of the stored digital image in the remote projector; and displaying the annotated stored digital image in the local projector.

* * * * *